United States Patent [19]

Tassinario

[11] Patent Number: 4,879,485
[45] Date of Patent: Nov. 7, 1989

[54] PERMANENT MAGNET ROTOR

[75] Inventor: Giampiero Tassinario, Florence, Italy

[73] Assignee: Mavilor Systemes S.A., Switzerland

[21] Appl. No.: 236,996

[22] Filed: Aug. 25, 1988

[30] Foreign Application Priority Data

Sep. 16, 1987 [CH] Switzerland .................. 3565/87

[51] Int. Cl.$^4$ ............................................. H02K 21/12
[52] U.S. Cl. .................................... 310/156; 310/42; 310/43; 310/271
[58] Field of Search ............... 310/156, 152, 261, 255, 310/181, 218, 91, 270, 271, 208, 198, 42, 43, 45, 214, 262

[56] References Cited

U.S. PATENT DOCUMENTS

| 4,219,752 | 8/1980 | Katou ................................. 310/156 |
| 4,434,546 | 3/1984 | Hershberger ....................... 310/156 |
| 4,674,178 | 6/1987 | Patel .................................... 310/43 |
| 4,683,388 | 7/1987 | DeCesare ........................... 310/270 |
| 4,714,852 | 12/1987 | Kawada et al. .................... 310/156 |

FOREIGN PATENT DOCUMENTS

| 0454636 | 2/1975 | U.S.S.R. ............................ 310/156 |
| 0763094 | 12/1956 | United Kingdom ............... 310/156 |
| 07741195 | 5/1957 | United Kingdom ............... 310/156 |

Primary Examiner—R. Skudy
Attorney, Agent, or Firm—Kane, Dalsimer, Sullivan, Kurucz, Levy, Eisele and Richard

[57] ABSTRACT

It comprises a cylinder (2) forming the rotor body, extended on each side by the shaft (1), and eight curved permanent magnets (3A to 3H) disposed on the cylindrical surface of the rotor body (2). The magnets (3A to 3H) are secured by adhesive bonding to the rotor (2) and because of their shape leave between them, in the axial direction, V-shaped interstices (a to h). A thread (5) of carbon fibers passes in succession in each of the interstices (a to h) a plurality of times, applying compression forces to the inclined faces of the magnets (3A to 3H), which are thus firmly held against the rotor. The interstices are then filled with a resin to obtain a continuous cylindrical surface.

11 Claims, 1 Drawing Sheet

PERMANENT MAGNET ROTOR

FIELD OF THE INVENTION

The present invention relates to a permanent magnet rotor for an electric motor, the rotor comprising a cylinder forming its body and provided with a plurality of curved permanent magnets disposed on the periphery of the cylinder.

PRIOR ART

Permanent magnet rotors for electric motors are well known and different types of these rotors are on the market. These rotors comprise a cylindrical body on the periphery of which the permanent magnets, which in principle are curved, are disposed. The magnets are fixed by adhesive bonding or by any other means of anchoring a relatively complicated structure. The permanent magnets cannot be fixed solely by adhesive bonding, because in dependence on the speed of rotation of the rotor the centrifugal forces to which the magnets are subjected are considerable and may cause their detachment. A simple means, from the constructional point of view, consists in surrounding the periphery of the rotor carrying the bonded magnets with a carbon fiber thread wound in the peripheral direction and radially pressing the magnets against the cylindrical body in order to compensate for centrifugal forces due to the rotation of the rotor. This simple construction has the disadvantage of increasing the magnetic air gap between the rotor and the stator.

The present invention seeks to provide a permanent magnet rotor of simple construction, which obviates the disadvantage of an increased magnetic air gap.

SUMMARY OF THE INVENTION

The rotor according to the invention is characterized by the fact that the magnets are secured by adhesive bonding to the rotor and are spaced apart in the peripheral direction so as to form axial interstices, that these interstices are partly filled with a continuous tensioned thread of nonmagnetic material which passes from one interstice to another, passing alternately over the plane faces of the rotor, and that the remainder of the space in each interstice is filled with a resin.

The advantages of this rotor consist of the ease of its manufacture, since the magnets are held against the rotor body by the compression forces applied by the thread stretched between the interstices, and the fact that this construction does not enlarge the magnetic air gap because the thread holding the permanent magnets is situated inside the axial interstices and not on the periphery of the rotor. It should also be observed that by filling the interstices with the thread and the resin a rotor is obtained which has a continuous cylindrical surface, so that the risk of possible unbalance is also reduced.

In order to cancel the axial forces applied by the tensioned thread on the magnets when it passes alternately over the plane faces of the rotor, which could have the consequence of an axial displacement of each magnet on the cylindrical body, the thread is passed in both directions in each interstice, so that the resultant of these opposed axial forces is zero. To this end, the thread is for example passed once in all the interstices and, when the starting interstice is reached again, this is repeated but with a change of the direction of movement over the plane face of the rotor, that is to say, if the first time the thread leaving the first interstice was passed to another interstice by movement in the clockwise direction, on the second occasion it will be passed in the counterclockwise direction.

It is of course possible first to make some passes in one direction and then to make the same number of passes in the opposite direction, and so on.

In one variant embodiment the interstice is V-shaped, care having been taken to provide magnets whose faces parallel to the axis of the rotor are inclined so that two such adjacent faces of two magnets following one another in the peripheral direction of the rotor diverge in the outward direction, in such a manner as to increase the radial components of the forces applied to the magnets by the thread disposed in the interstices.

In a preferred variant embodiment, before the thread is applied a member of nonmagnetic material, for example of brass, is disposed at the bottom of each interstice, this member having a shape matching that of the bottom of the interstices, thus permitting better distribution of the compressive force (wedge action).

In order to obtain the greatest possible radial compression component applied by the thread to the magnet, it would be necessary for the thread to pass from one interstice to the diametrically opposite interstice. However, because of the shaft which extends on each side of the rotor, this is not possible.. The thread is therefore passed from one interstice to another along an at least approximately straight line which is as close as possible to the diameter of the plane face, allowing for the rotor shaft.

BRIEF DESCRIPTION OF THE DRAWINGS

The invention will be described in greater detail with the aid of the accompanying drawings which show a preferred embodiment of the invention.

DESCRIPTION OF THE PREFERRED EMBODIMENTS

The rotor is composed of a cylindrical body 2 mounted on a shaft 1 extending on both sides of the body 2. The cylindrical body 2 may for example be composed of a stack of sheets of magnetic material mounted on the shaft 1 or may be solid, depending on whether the stator is or is not provided with slots. Eight permanent magnets 3A, 3B, 3C, 3D, 3E, 3F, 3G, 3H are fixed by adhesive bonding on the periphery of the body 2, each permanent magnet having the shape of an annular sector. The magnets 3A to 3H are disposed on the periphery of the rotor 2 in such a manner as to leave axial interstices a, b . . . h. In the case illustrated in FIG. 1, those faces of the magnets 3A to 3H which are parallel to the axis of the rotor are inclined and diverge outwardly, so that the interstices a, b . . . h are V-shaped.

Figure 2:
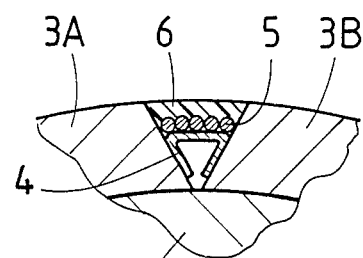
FIG. 2 is an enlarged detail of FIG. 1.

At the bottom of each interstice a, b . . . h is disposed a nonmagnetic member 4 (FIG. 2), which in the present case is a small folded brass plate. Over these plates is passed a thread of carbon or glass fibers 5 applying a compression force to the member 4 and consequently to the two inclined faces of the adjacent magnets.

Figure 1:
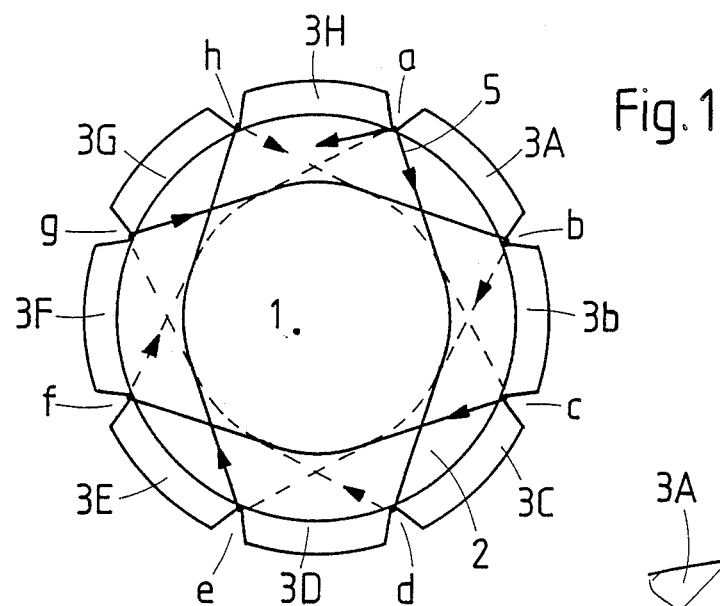
FIG. 1 is a view parallel to the axis of the rotor.

One example of the manner in which the thread 5 may be passed through the interstices a, b . . . h is illustrated in FIG. 1. Starting from the interstice a, the thread is passed over the plane front face of the rotor 2 (FIG. 1), into the interstice d, returned over the rear plane face of the rotor 2, into the interstice g, then over the front plane face, into the interstice b, and so on. The thread thus passes in order through the interstices e, h, c, f and returns into the interstice a. Thereupon, either the same route is followed a number of times in the same order and then, on passing out of the interstice a, the thread is passed in the opposite direction, that is to say a, f, c, h, e, b, g, d, a the same number of times, or these passes are made in each direction alternately.

The purpose of this change of direction is to obtain the cancellation of the component of the axial forces applied to each magnet. The thread 5 stretched from one interstice to the other applies in fact to the member 4 a compression having a radial component necessary for holding the magnets close against the body 1. When the thread 5 passes over the plane face of the rotor, for example on leaving the interstice a and entering the interstice d, it applies to the two faces of the magnets 3A and 3C, which can be seen in FIG. 1, axial forces (directed at right angles to the plane of the figure) which may have the in the axial displacement of these magnets. The same obviously also applies to the other magnets; for example the magnets 3D and 3F are pushed axially in the opposite direction to that of the magnets 3A and 3C, and so on. In order to cancel these axial forces, it is necessary to apply opposite axial forces to these magnets, and to do this it is sufficient to pass the thread in the opposite direction, as previously explained. In this way the thread will for example pass from the interstice a to the interstice d while bearing against the front plane face of the rotor and applying to the magnets 3H and 3F axial forces opposite to those applied during the passage from the interstice a to the interstice d via the rear plane face of the rotor.

It should be noted that the radial component of the compression applied to the member 4 is greater when the thread 5 passes from one interstice to the other by following, on the plane faces of the rotor, paths which are as close as possible to the diameter of these plane faces, but the presence of the shaft 1 prevents diametrical passage from one interstice to another, and therefore it is attempted to pass as closely as possible and approximately in a straight line.

In FIG. 1 the paths chosen (a-d, d-g and so on) are not quite straight lines, but for the case illustrated they are the paths which produce the largest radial component.

The thread 5 is in principle placed in position by a machine known per se and used for winding an axially slotted rotor, so that the rotor according to the invention can be manufactured without using special machines.

After the thread 5 has been laid taut (as explained previously), the remaining space is filled with resin 6, in such a manner as to obtain a continuous cylindrical surface.

Figure 3:
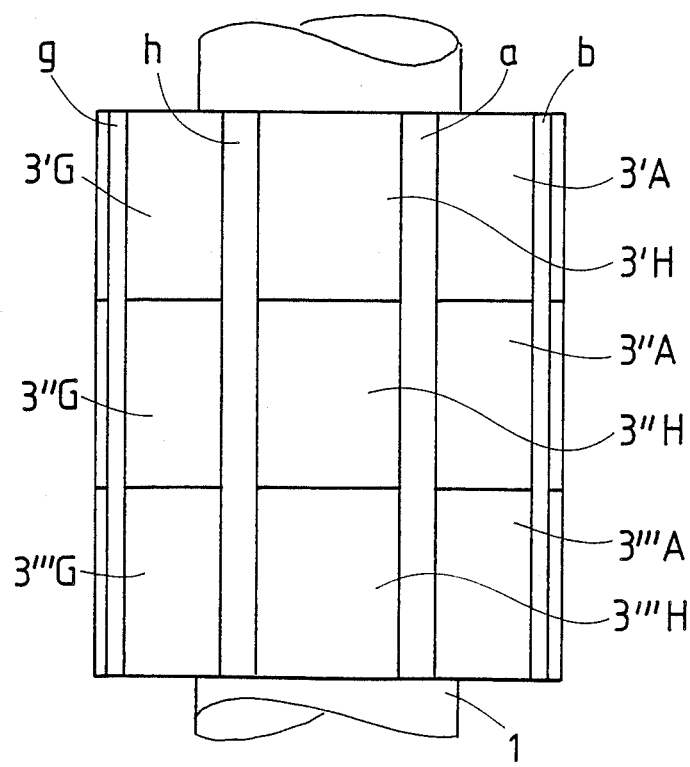
FIG. 3 is a front view of FIG. 1, without the threads or the resin.

As can be seen in FIG. 3, the magnets are not necessarily formed axially in one piece, and, as in FIG. 3, each magnetic pole may be composed of three juxtaposed permanent magnets 3'A, 3"A, 3'''A; 3'H, 3"H, 3'''H; 3'G, 3"G, 3'''G, and so on.

I claim:

1. A permanent magnet rotor for an electric motor, the rotor comprising a cylinder forming its body and provided with a plurality of curved permanent magnets disposed on the periphery of the cylinder, and secured in a predetermined manner to the body of the rotor, wherein the magnets are secured by adhesive bonding to the rotor and spaced apart in the peripheral direction so as to form axial interstices, wherein said interstices are partly filled with continuous tensioned thread of nonmagnetic material which passes from one interstice to another, passing alternately over plane faces of the rotor, and that the remainder of space in each interstice is filled with a resin.

2. A rotor as claimed in claim 1, wherein after having passed at least once in all the interstices the thread passes at least a second time in the opposite direction in the interstices.

3. A rotor as claimed in claim 2 wherein the plane faces of each magnet parallel to the axis of the rotor being inclined in such a manner that an adjacent plane face of two magnets following one another in peripheral direction diverge outwardly.

4. A rotor as claimed in claim 3, wherein the thread bears against a member of nonmagnetic material which is disposed at the bottom of each interstice and has a shape matching that of the interstice.

5. A rotor as claimed in claim 4, wherein the thread passes from one terstice to another in such a manner as to leave at least one interstice between them.

6. A rotor as claimed in one of claim 4, wherein the thread passes from one interstice to another in such a manner that that portion of the thread which bears against one of the plane faces of the rotor is at least approximately straight and as close as possible to the diameter of the plane face of the rotor, allowing for the presence of a rotor shaft.

7. A rotor as claimed in claim 6, wherein the thread is a carbon fiber thread.

8. A rotor as claimed in claim 6, wherein the thread is a glass fiber thread.

9. A rotor as claimed in claim 4, wherein said member is a folded brass plate.

10. A rotor as claimed in claim 9, wherein each magnetic pole is formed in the axial direction of a plurality of juxtaposed magnets.

11. A rotor as claimed in claim 10, wherein the outer surface of the rotor is a perfectly continuous cylinder after the interstices have been filled with resin.

* * * * *